June 7, 1960 S. ROTHMAN 2,939,665
CAM-OPERATED CLAMPING DEVICE
Filed July 23, 1958 2 Sheets-Sheet 2
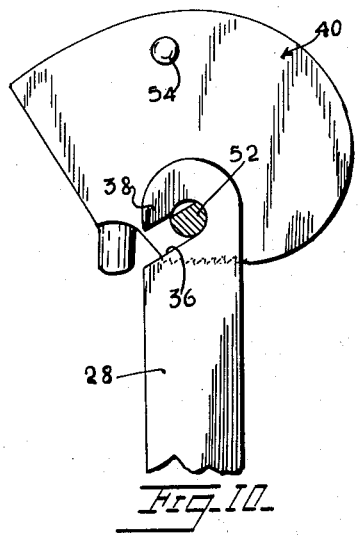
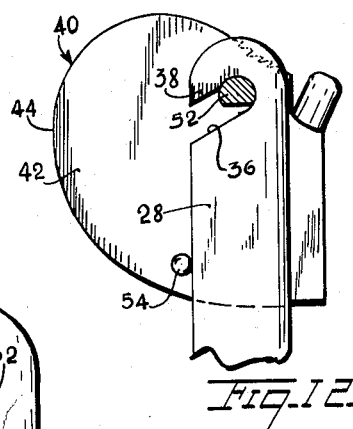
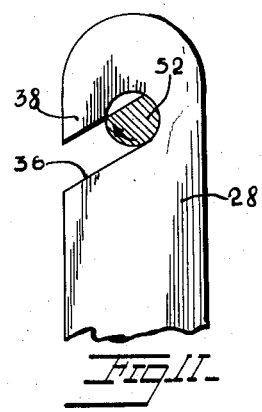
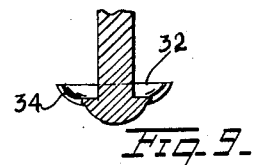
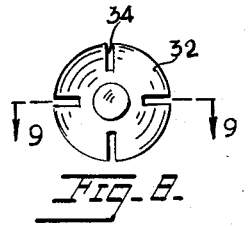
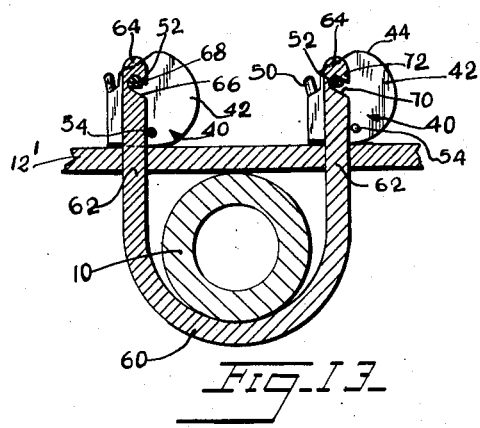
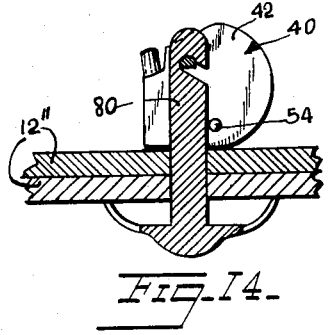
INVENTOR.
STANLEY ROTHMAN
BY
ATTORNEY

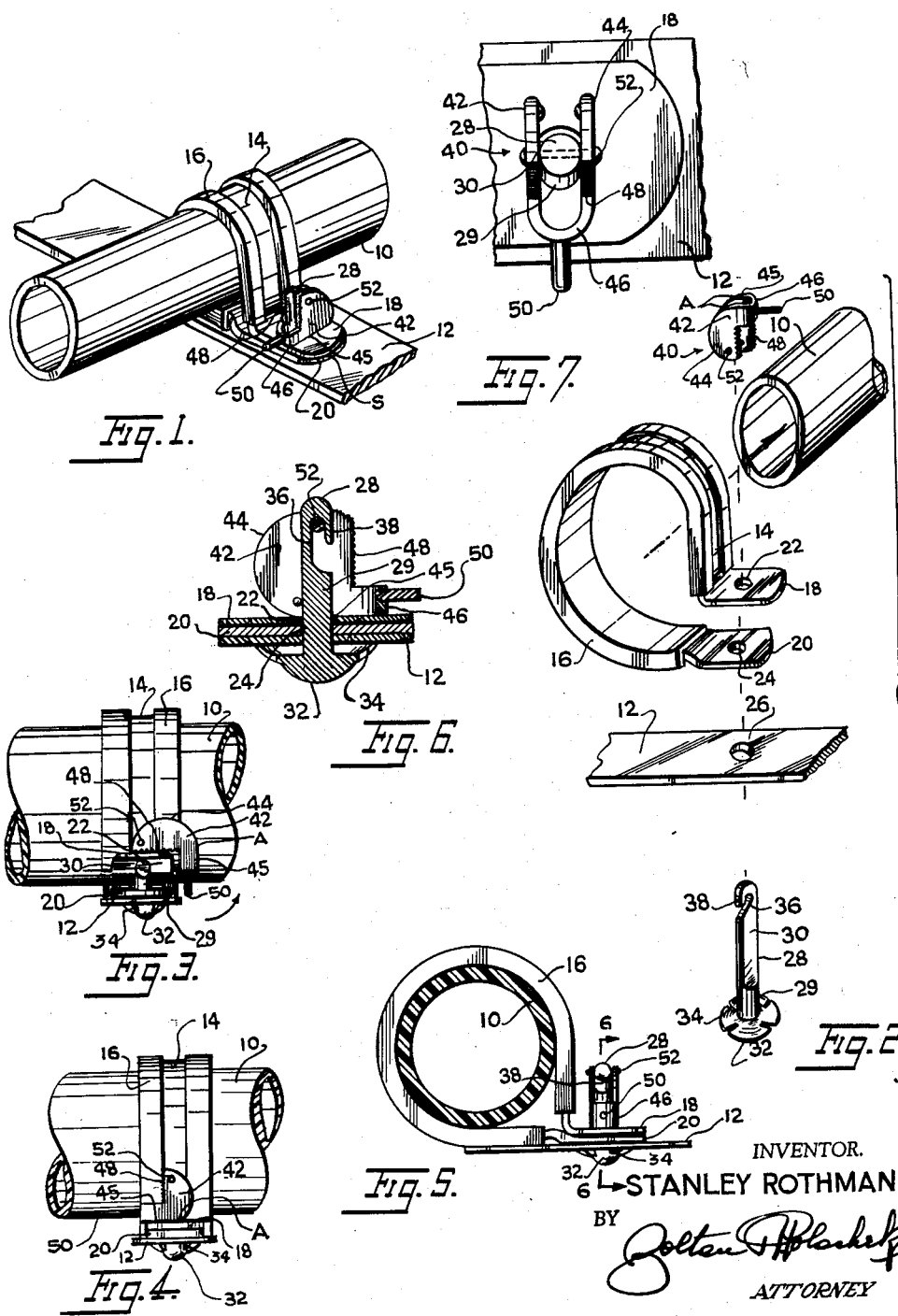

United States Patent Office 2,939,665
Patented June 7, 1960

2,939,665

CAM-OPERATED CLAMPING DEVICE

Stanley Rothman, 1314 E. 36th St., Brooklyn, N.Y.

Filed July 23, 1958, Ser. No. 750,468

2 Claims. (Cl. 248—74)

This invention relates to the art of clamping devices, and particularly concerns a novel cam-operated device for clamping a pipe to a flat surface, plate or the like.

According to the invention, there is provided a clamping device of general utility adapted to encircle and secure a cylindrical rod or tubular pipe to a flat surface.

A principal object is to provide a clamping device which can be disassembled and reassembled as and where required upon a pipe which may be stationary.

A further object is to provide a clamping device including a lever-operated cam member detachably engaged with a clamping member.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the clamping device embodying the invention securing a pipe to a flat plate.

Fig. 2 is an exploded perspective view of the components included in the assembled components of Fig. 1.

Fig. 3 is a side elevational view of the assembly with the clamp unlocked.

Fig. 4 is a view similar to Fig. 3 with the clamp locked.

Fig. 5 is an end elevational view of the locked assembly of Fig. 4.

Fig. 6 is a sectional view on an enlarged scale taken on line 6—6 of Fig. 5 and showing details of the clamping components.

Fig. 7 is a top plan view on an enlarged scale of part of the assembly of Fig. 5.

Fig. 8 is an enlarged bottom plan view of the fulcrum post or pin.

Fig. 9 is a sectional view taken on the plane of the line 9—9 of Fig. 8.

Fig. 10 is a part sectional view and part elevational view, showing the clamping components at the start.

Fig. 11 is a part sectional and part elevational view of the fulcrum post and shaft of the cam member showing the position of the parts at the start of the closing movement of the cam member.

Fig. 12 is a similar view showing the position of the parts at the end of the closing movement of the cam member.

Fig. 13 is a vertical sectional view showing a modification of the invention.

Fig. 14 is a similar view to Fig. 13, showing a still further modified form of the invention.

Referring to Figs. 1–5 of the drawings, there is shown a cylindrical or tubular member 10 which can be a pipe, rod or similar member, which is to be detachably secured to a flat plate or bar 12.

A split band 14 formed preferably of a metal strip is provided to encircle the round member 10. If pipe 10 is made of a relatively soft material such as plastic, the metal strip is partially encased in a resilient rubber sheath 16. Ends 18 and 20 of the band 14 extend beyond the sheath and are offset to extend substantially tangentially to the pipe 10 when the ends of the band are closed and locked by the clamping device, as best shown in Fig. 5.

Registering apertures 22 and 24 are provided in the ends 18 and 20 of the band. The flat plate or bar 12 which may be elongated is provided with a circular aperture 26 at the location where the clamping device is to be engaged, as shown in Figs. 2 and 6.

The clamping device includes a fulcrum post or pin 28 having a generally cylindrical shank 29 with opposite flattened sides 30 extending from the free end thereof. The other end of the pin terminates in a dish-shaped circular head 32 having spaced peripheral radial slots 34. The shank has a bearing notch 36 in one long edge at its free end to form a hook 38, as clearly shown in Fig. 6.

The clamping device also includes a cam member 40 formed with two parallel plates constituting walls 42 having semicircular or 180° outer edge portions 44 terminating at points A where the edges become straight and extend tangentially to edge portions 44 as shown at 45. The walls are joined by an integrally formed U-shaped bridge 46. The bridge is undercut to provide straight edge portions 48 on each wall extending chordally and terminating at curved portions 44. The straight edge portions may be provided with teeth or otherwise serrated or roughened. In the bridge or bight portion 46 of the cam member 40 there is secured a handle 50 which extends outwardly from the member parallel to walls 42. A shaft or axle 52 extends transversely across the space between the walls 42 near the corners of the walls where the straight edge portions 48 join the curved edge portions 44. The bearing notch 36 of pin or post 28 is adapted to fit over the shaft 52 so that the cam member 40 may turn on the pin 28.

Fig. 6 shows the shaft 52 extending through the notch 36 and Fig. 7 shows flat sides 30 of post 28 disposed between walls 42 of the cam member 40 with shaft 52 extending therethrough.

In Fig. 2 there are shown the several components of the assembly. Band 14 can be inserted over an end of pipe 10, or the ends 18 and 20 thereof can be separated to engage the band over an intermediate portion of the pipe to encircle the pipe. The shank 29 of pin 28 is inserted through apertures 26, 24 and 22, in turn. The notch portion 36 of the shank extends upwardly from band end 18 so that shaft 52 of member 40 can be engaged therein with the handle 50 in the depending position shown in Fig. 3. The serrated edge portions 48 of walls 42 will then be pressed against the outer side of band end 18 because of the upward bias of this end due to the spring-like structure of the band. In this position band ends 18 and 20 are separated and the clamping device is unlocked as shown in Fig. 3.

In order to lock the clamping device, the shaft 52 carrying the cam member 40 is turned manually in bearing notch 36 of fulcrum post 28 anticlockwise as viewed in Fig. 3 by finger pressure on handle 50. A 180° turn of the shaft and cam member 40 from the position of Fig. 3 first moves the curved portions or camming faces 44 of walls 42 of the cam member over the upper side of band end 18 until the straight edge portions 45 are reached at points A. A further 90° turn brings the edge portions 45 against the band 18 to lock the cam member securely in the position shown in Figs. 1, 4, 5, 6, and 7. Since shaft 52 is located near the corners where the edge portion 44 ad 48 meet, the walls 42 rotate on or swing about an eccentrically located axis. Points A are the ends of the longest radii of the cam plates from shaft 52. The pressure on band end 18 increases as the cam member is turned from the shortest radii of the cam walls to the longest radii at points A, due to the increasing tension in band 14 as band end 18 is forced toward the band end 20. Dimple protrusions 54 on the inner surfaces of walls 42 engaging the sides of the fulcrum post 28 prevent accidental opening of the cam member 40.

In order to make the clamping action effective in the device, the length of the shank of pin or post 28 from the inner end of notch 36 to the head 32 should not be less than the length of the maximum radius of the cam member walls 42, plus the combined thickness of band ends 18, 20 and of plate 12.

If desired, the cam member 40 can be pivoted when in the locked position on pin 28 using the cylindrical shank portion thereof as an axis so that handle 50 extends perpendicular to the axis of pipe 10 rather than parallel to it as shown in the drawing. If pivotal movement of the locked cam member is not desired, the opening 26 in bar 12 will be shaped square instead of round and the shank portion 29 can be formed with flat sides 30 extending downwardly so that they are juxtaposed to the sides of square aperture 26 in bar 12. Then the pin 28 will be locked against rotation with respect to the bar 12 and pipe 10.

The clamping device is so constructed that pin 28 and clamp member 40 can be quickly disassembled and band 14 can be disengaged without disturbing pipe 10. Thus, if pipe 10 is a long member, it can be secured to bar 12 at any desired intermediate point on the pipe without disconnecting the pipe from an end support to effect the mounting of the clamping member.

Bar 12 as well as pipe 10 could be elongated and the clamping device will be quickly attachable thereto and detachable therefrom in the same manner as described above. If desired, the bar 12 can be secured with its long axis parallel to the axis of pipe 10 rather than perpendicular thereto.

In the modification shown in Fig. 13, a pipe 10 is shown fastened to the undersurface of a plate 12' by means fo a modified clamping device. The modified clamping device consists of a flat metal strip 60 or circular cross-section rod of U-shaped formation open at the top with its ends extending through spaced slots 62 formed in the plate 12'. At one of the protruding ends 64 of the strip, or rod, the inner long edge thereof is formed with a notch 66 opening inwardly and forming a hook 68 thereabove. The other protruding end 64 of the strip or rod 60 is similarly formed with a notch 70 in the outer long edge and opening outwardly thereof to form a hook 72 thereabove.

A cam member 40 spans each of the protruding ends 64 with its shaft 52 journalled in the respective notch 66 or 70 so that turning of the shaft by the handle 50 brings the curved peripheries 44 of the walls 42 thereof into locking engagement against the upper surface of the plate 12' as shown in Fig. 13. In order to open the clamp, the cam member is turned in the opposite direction.

In Fig. 14, a single stem 80 is shown to lock plates 12" together by a cam member 40 as previously described.

The clamping device disclosed requires no tools to attach or loosen. No threading of the clamping member is required to tighten it as in prior known types of clamping members.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A clamping device for securing a tubular member and a flat apertured plate together, comprising a split band formed of a spring metal strip adapted to encircle said tubular member, the free ends of said band being apertured and being offset to extend substantially tangentially to said tubular member, a fulcrum pin having a terminal head and a generally cylindrical shank, said shank being extendible through the apertures in said plate and band ends with said apertures in registration with each other, said shank terminating in a bearing notch, and a cam member having a transversely disposed shaft removably engageable in said bearing notch of said shank so that the cam member is turnable with respect to said pin to draw said band ends together under spring tension therein, said cam member including two parallel plate portions joined by an integrally formed bridge portion, said shaft terminating at eccentric positions on said plate portions, each of said plate portions having a curved edge portion extending less than 360° from a point near said termination of the shaft to a point of maximum radius of said plate portion from said shaft, each of said plate portions having a substantially straight edge portion extending substantially tangentially from said curved edge portion from said point of maximum radius, said substantially straight edge portions being continuous across said bridge portion, said bridge portion being undercut to provide substantially straight serrated edge portions on each blade extending chordally to terminate at said curved edge portions, there being a handle extending outwardly from said bridge portion for pivoting said cam member on said shaft, said shank having flat side portions adapted to move slidably between said parallel plate portions, said flat side portions being extended to engage in the aperture in said flat apertured plate, the aperture in said plate being square to prevent rotation of the pin therein, said shaft being held in said recess in abutment with an inner end of the notch when the cam member is locked by spring tension in said band ends, said shank having a length from the inner end of the bearing notch to said head which is not less than the length of the maximum radii of said plate portions plus the combined thickness of said band ends and flat plate.

2. A clamping device for securing a tubular member and a flat apertured plate together, comprising a split band formed of a spring metal strip adapted to encircle said tubular member, the free ends of the band being apertured and offset to extend substantially tangentially to said tubular member, a fulcrum pin having a terminal head and a generally cylindrical shank, said shank being extendible through the apertures in said plate and band ends with said apertures in registration with each other, said shank terminating in a bearing notch, and a cam member having a transversely disposed shaft removably engageable in said recess of said shank so that the cam member is turnable with respect to said pin to draw said band ends together under spring tension therein, said cam member including two parallel plate portions joined by an integrally formed bridge portion, said shaft terminating at eccentric positions on said plate portions, each of said plate portions having a curved edge portion extending less than 360° from a point near said termination of the shaft to a point of maximum radius of said plate portion from said shaft, each of said plate portions having a substantially straight edge portion extending substantially tangentially from said curved edge portion from said point of maximum radius, said substantially straight edge portions being continuous across said bridge portion, said bridge portion being undercut to provide substantially straight serrated edge portions on each blade extending chordally to terminate at said curved edge portions, there being a handle extending outwardly from said bridge portion for turning said cam member and shaft on said pin, said shank having flat side portions adapted to move slidably between said parallel plate portions, said flat side portions being extended to engage in the aperture in said flat apertured plate, said shaft being held in said notch in abutment with a hooked end of the notch when the cam member is locked by spring tension in said band ends, and dimpled protrusions on the inner surfaces of the walls of the cam member holding said cam member against accidental displacement.

References Cited in the file of this patent

UNITED STATES PATENTS

| 355,021 | Lang | Dec. 28, 1886 |
| 701,669 | Atkinson | June 3, 1902 |
| 2,692,746 | Thomas | Oct. 26, 1954 |

FOREIGN PATENTS

| 419,035 | Italy | Mar. 13, 1947 |